United States Patent

Wu et al.

[11] Patent Number: 5,963,291
[45] Date of Patent: Oct. 5, 1999

[54] OPTICAL ATTENUATOR USING POLARIZATION MODULATION AND A FEEDBACK CONTROLLER

[75] Inventors: Kuang-Yi Wu; Jian-Yu Liu, both of Boulder, Colo.; Yen-Chen Chen, Hsinchu, Taiwan

[73] Assignee: Chorum Technologies Inc., Richardson, Tex.

[21] Appl. No.: 08/897,353

[22] Filed: Jul. 21, 1997

[51] Int. Cl.[6] .............................. G02F 1/13; G02F 1/133; G02B 27/10

[52] U.S. Cl. ........................... 349/196; 349/17; 385/140; 250/225; 359/246; 359/303; 359/320

[58] Field of Search ................................ 349/17, 18, 196, 349/197; 359/239, 246, 251, 252, 259, 298, 303, 618, 320; 250/201.1, 554.2, 227.14, 225, 205, 204; 385/5, 140, 23

[56] References Cited

U.S. PATENT DOCUMENTS

| | | | |
|---|---|---|---|
| 3,684,350 | 8/1972 | Wentz | 359/618 |
| 4,410,238 | 10/1983 | Hanson | 349/106 |
| 5,015,057 | 5/1991 | Rumbaugh et al. | 350/96.15 |
| 5,338,481 | 8/1994 | Wu et al. | 252/299.01 |
| 5,544,182 | 8/1996 | Nagaishi et al. | 372/29 |
| 5,727,109 | 3/1998 | Pan et al. | 349/106 |
| 5,745,634 | 4/1998 | Garret et al. | 385/140 |
| 5,754,571 | 5/1998 | Endoh et al. | 372/20 |
| 5,771,120 | 6/1998 | Bergmann | 359/484 |

*Primary Examiner*—William L. Sikes
*Assistant Examiner*—Kenneth Parker
*Attorney, Agent, or Firm*—Dorr, Carson, Sloan & Birney, P.C.

[57] ABSTRACT

An optical power regulator employs a variable optical attenuator having a first birefringent element that spatially separates the input optical beam into two orthogonally-polarized beams. Both beams pass through a polarization modulator (e.g., a liquid crystal material) that rotates their polarizations to an extent determined by the control voltage applied across the polarization modulator. A final birefringent element spatially separates both beams exiting the polarization modulator into two pairs of orthogonally-polarized beams (i.e., two horizontally-polarized and two vertically-polarized components). The thicknesses and optical properties of the birefringent elements are selected so that two of the four beams are combined by the final birefringent element to exit at the output port of the regulator, while the remaining two beams are blocked. As a result, the degree of attenuation is determined by the degree of polarization rotation by the polarization modulator, which in turn is a function of the control voltage applied to the polarization modulator. Preferably, the liquid crystal material used in the polarization modulator has a high optical birefringence and a low dielectric anisotropy, which results in a relatively shallow attenuation curve as a function of applied voltage. The intensity of the optical signal is measured by a photodetector and used by a controller to output the control voltage applied to the liquid crystal material to maintain a desired optical power level at the output port of the regulator.

16 Claims, 11 Drawing Sheets

TIME →

*Fig. 7(d)*

TIME →

OPTICAL ATTENUATOR USING POLARIZATION MODULATION AND A FEEDBACK CONTROLLER

BACKGROUND OF THE INVENTION

1. Field of the Invention

The present invention relates generally to the field of optical power regulators for fiber optic networks. More specifically, the present invention discloses a broadband liquid-crystal optical power regulator.

2. Statement of the Problem

Optical power regulators are used in fiber optic networks to regulate the optical power levels. Optical power levels in an optical network can vary widely due to component malfunctions, network faults, or variations in the gain of optical amplifiers. Photoreceivers can be damaged if optical power levels become too great. When the optical power fluctuates, the optical power regulator adjusts its attenuation such that the output optical power level stays constant.

Optical amplifiers together with wavelength-division multiplexing (WDM) technology have become the standards for backbone fiber optic transmission networks. In WDM systems, multiple wavelength optical channels are launched into optical fibers. These optical signals are repeatedly amplified by erbium-doped fiber amplifiers (EDFA) along the network to compensate for transmission losses. The amplified signals reach the receiving end and are detected using WDM filters followed by photoreceivers.

One potential problem from the system point view is that there is gain competition from the EDFA. Gain competition can be understood by considering an EDFA having four input optical signals with almost equal power. If the EDFA has flat gain response, the output signals will have almost equal output power. However, if one of the input channels is degraded or fails, the output signals in the remaining three channels will experience a gain increase, thereby increasing their optical power. This can potentially overexpose the photodetectors and damage the receiver. This problem can be avoided by placing an optical regulator in the network to dynamically maintain optical power below a predetermined maximum level.

Conventionally, this problem is solved by using a variable optical attenuator. The optical attenuator is constructed by mounting a variable neutral density filter on a motor. By rotating the variable neutral density filter, variable optical transmission (attenuation) can be obtained. This type of attenuator, however, is based on opto-mechanical technology, which consumes a large amount of electrical power and has a limited lifetime. Opto-mechanical attenuators are especially weak when used in a dynamic power adjustment environment.

Variable attenuators based on liquid crystal technology are also commercially available. However, they are generally constructed so that in the absence of an applied voltage, their attenuation is at its maximum (i.e., lowest transmission). This is sometimes referred to as a normally "off" device. This design has two disadvantages. First, the applied voltage has to be "on" most of the time to let optical energy pass through the device. Second, if a black-out occurs, the attenuator will block the optical energy completely which is not preferred in most system designs.

U.S. Pat. No. 4,410,238 (Hanson) discloses a liquid-crystal attenuator that is polarization dependent and has a normally "on" design. However, the liquid crystal material used by Hanson has a steep slope for attenuation as a function of applied voltage, it is not well suited for use as a variable optical attenuator.

Other types of liquid-crystal attenuators, such as that taught by U.S. Pat. No. 5,015,057 (Rumbaugh et al.), use a polymer-dispersed liquid crystal (PDLC) film to scatter optical energy. However, residual insertion loss is high and a high voltage must be applied to achieve high transmission with this approach. PDLC attenuators are also always "off" devices, which again is not preferred from the system perspective, as previously discussed. Finally, all liquid crystal attenuators suffer slow switching times due to the small optical birefringence ($\Delta n$ of about 0.17) or high viscosity of conventional liquid crystal materials.

3. Solution to the Problem

The present invention is a broadband optical power regulator that utilizes the unique broadband nature of birefringent crystals and a polarization modulator to achieve a constant optical power output. The liquid-crystal variable attenuator (LCVA) used in the present power regulator also has features that distinguish it from the prior art, such as Hanson. A liquid crystal material is employed having a large optical birefringence but a small dielectric anisotropy. The large optical birefringence results in a thin liquid crystal cell, that dramatically reduces the switching time of the attenuator. The small dielectric anisotropy (the difference between parallel and perpendicular dielectric constants, $\Delta\epsilon=\epsilon_{//}-\epsilon_{\perp}$) results in a shallow slope for the attenuation curve as a function of the control voltage. This produces a more stable attenuation level for the regulator and a much greater number of controllable gray levels. A three-level driving scheme can be implemented to achieve high-speed switching. This feature is especially desirable because if an optical power surge occurs on the network, the regulator should respond to this noise as quickly as possible to prevent damage to the optical receiver. The present design is also relatively insensitive to changes in the applied voltage or temperature.

SUMMARY OF THE INVENTION

The present invention provides an optical power regulator that employs a variable optical attenuator with a feedback controller. A first birefringent element spatially separates the input optical beam into two orthogonally-polarized beams. Both beams pass through a polarization modulator (e.g., a liquid crystal material) that rotates their polarizations to an extent determined by the control voltage applied across the polarization modulator. A final birefringent element spatially separates both beams exiting the polarization modulator into two pairs of orthogonally-polarized beams (i.e., two horizontally-polarized and two vertically-polarized components). The thicknesses and optical properties of the birefringent elements are selected so that two of the four beams are combined by the final birefringent element to exit at the output port of the regulator, while the remaining two beams are blocked. As a result, the degree of attenuation is determined by the degree of polarization rotation by the polarization modulator, which in turn is a function of the control voltage applied to the polarization modulator. Preferably, the liquid crystal material used in the polarization modulator has a high optical birefringence and a low dielectric anisotropy, which results in a relatively shallow attenuation curve as a function of applied voltage.

The intensity of the optical signal is measured by a photodetector and used by a controller to output the control voltage applied to the liquid crystal material to maintain a desired optical power level at the output port of the regulator. This invention provides a means for obtaining constant optical power output through a feedback controller despite wide fluctuations in input optical power over time. The power regulation level is adjustable through a control management signal. An array of variable attenuators can be used to simultaneously modulate a corresponding plurality of optical inputs with each having its own control signal.

These and other advantages, features, and objects of the present invention will be more readily understood in view of the following detailed description and the drawings.

BRIEF DESCRIPTION OF THE DRAWINGS

The present invention can be more readily understood in conjunction with the accompanying drawings, in which.

DETAILED DESCRIPTION OF THE INVENTION

Figure 1:
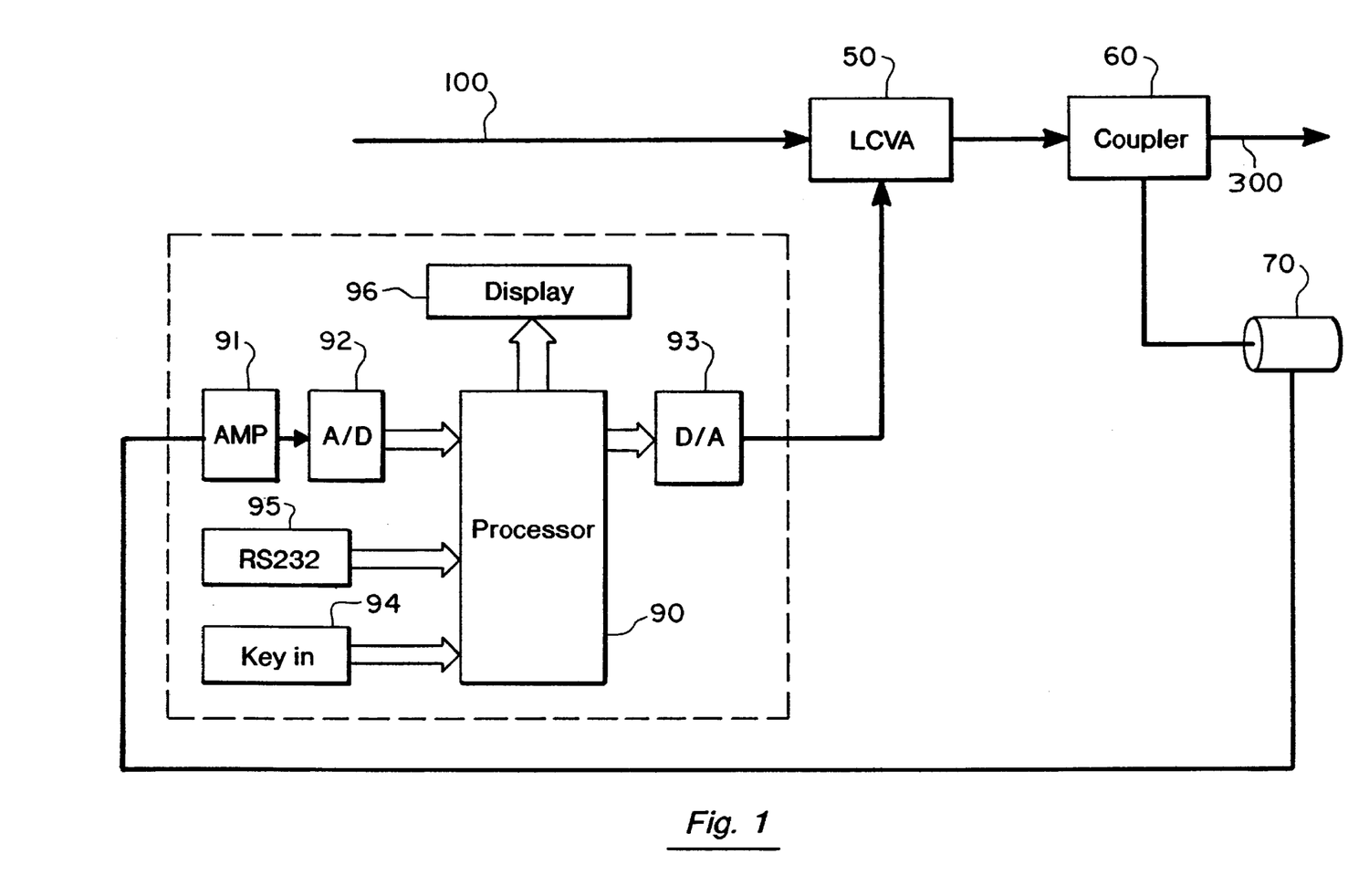
FIG. 1 is a simplified block diagram of an optical power regulator in accordance with this invention.

A broadband liquid-crystal optical power regulator is shown in FIG. 1. Optical energy enters from the input port 100 into the LCVA 50. The optical power output from the LCVA 50 is fed into a coupler 60 where a small amount of optical power is tapped to feed into a photodetector 70. In the preferred embodiment of the present invention, the current output by the photodetector 70 is amplified by an amplifier 91 and converted into a digital signal by an A/D converter 92. This optical power reading is processed by a processor 90 and compared to a set point specified by means of an RS-232 port 95 or a keypad 94. After the comparison, the processor 90 sends out new digital control signal that is converted into an analog signal by the D/A converter 93. This analog signal is applied to LCVA 50 to regulate the optical power. Through this feedback control, the output power 300 can be kept constant as input power fluctuates. The current power reading can also be displayed on a display 96.

Other types of controllers could be used to maintain the output optical power level at a desired set point. For example, an analog controller could be substituted for the A/D converter 92, processor 90, and D/A converter 93. A feed-forward configuration that measures the optical power level at the input of the LCVA 50 could substituted for the feedback controller. Also, a more sophisticated control scheme can be used in place of a single set point. For example, the controller can employ maximum and minimum set points separated by a dead zone. A combination of proportional, integral, and differential control can be employed to produce a more optimal controller.

Figure 2:
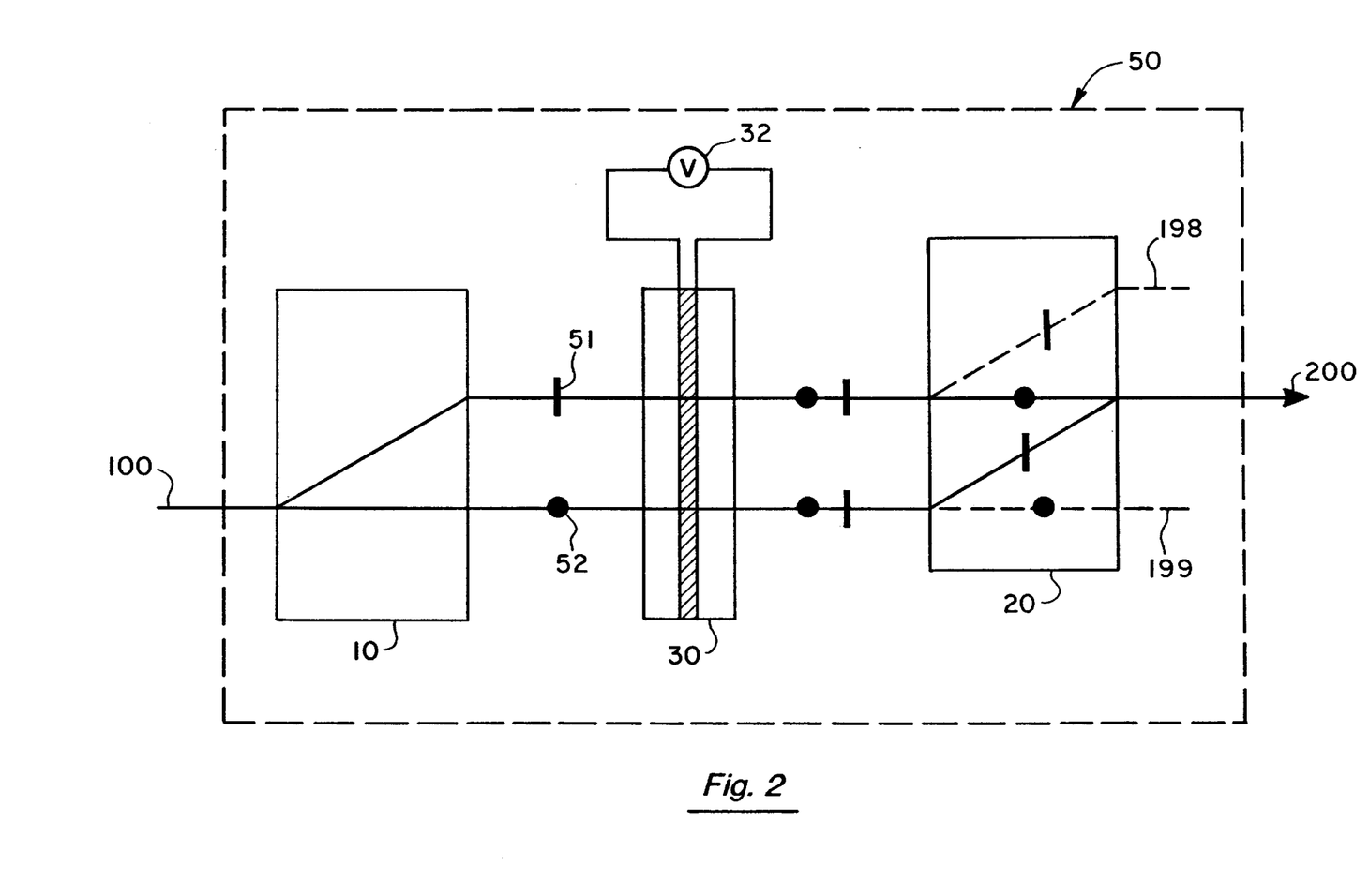
FIG. 2 is a simplified block diagram of the liquid-crystal variable beam attenuator 50.

Further detail of the structure of the LCVA 50 is shown in FIG. 2. An optical signal is input at port 100. The input optical signal is spatially separated by a first birefringent element 10 into two orthogonally-polarized beams due to the birefringent walk-off effect. The angle of redirection is a well-known function of the particular materials chosen. Examples of materials suitable for construction of the birefringent elements used in the present invention include calcite, rutile, lithium niobate, yttrium orthovandate-based crystals, and the like. Although birefringent crystals is used in the preferred embodiment, a similar function can be achieved through the use of a polarization beamsplitter combined with a prism. In FIG. 2, the horizontally-polarized beam is indicated by short lines 51 and the vertically-polarized beam is indicated by filled circles 52. A liquid-crystal polarization modulator 30 intercepts both orthogonally-polarized beams. The amount of polarization rotation by modulator 30 is dependent on the voltage applied by a voltage source 32. At the exit plane of the modulator 30, the two beams each carry a mixture of horizontal and vertical polarizations as indicated in FIG. 1. Both beams then enter a final birefringent element 20, which spatially separates the two sets of orthogonal polarizations carried by the two beams into four beams. As shown in FIG. 2, the thickness of the final birefringent element 20 is chosen to be essentially the same as the first birefringent element 10. Using this configuration, the horizontally-polarized component of the lower beam is combined with the vertically-polarized component of the upper beam when they exit the final birefringent element 20 at output port 200. In contrast, the vertically-polarized component of the lower beam 199 and the horizontally-polarized component of the upper beam 198 are routed away from the output port 200 and are dissipated.

In the embodiment illustrated in FIG. 2, the attenuator 50 is "off" when the control voltage 32 applied to the liquid crystal polarization modulator 30 is zero. In this state, the liquid crystal polarization modulator 30 rotates the polarization of both beams by 90 degrees, which results in low attenuation of the optical signal passing through the attenuator 50. As the control voltage 32 increases from zero, polarization rotation is reduced, and an increasing portion of the optical energy in both beams is directed away from the output port 200, thereby adjustably reducing the amount of optical power coupled into the output port 200 and increasing attenuation of the optical signal.

Figure 3:
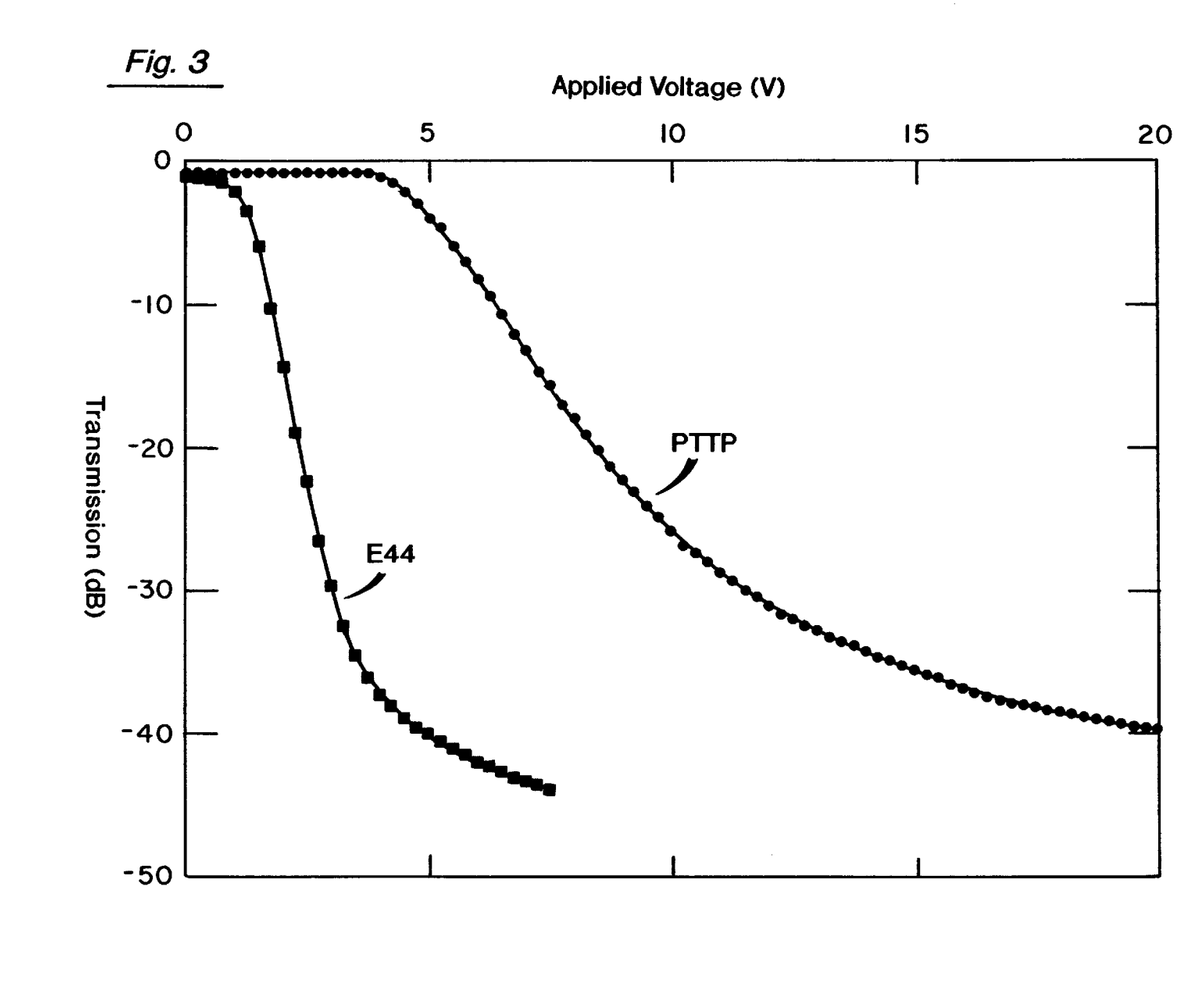
FIG. 3 is an graph showing an example of optical attenuation versus applied voltage for variable attenuators using a conventional liquid crystal material, and a liquid crystal material with a large optical birefringence ($\Delta n$ about 0.27) and small dielectric anisotropy ($\Delta \epsilon$ of about 1) at 1550 nm wavelength.

Conventional liquid crystal materials (e.g., E44 from EM Industries, Inc., 7 Skyline Drive, Hawthorne, N.Y. 10532) have a steep slope for their attenuation curve as a function of the applied voltage, as shown in FIG. 3. In contrast, the present invention employs a liquid crystal material having a high optical birefringence ($\Delta n$ of about 0.27) and a low dielectric anisotropy ($\Delta \epsilon$ of about 1). The low $\Delta \epsilon$ results in a shallow slope of the attenuation curve. For example, PTTP liquid crystal materials suitable for this purpose are disclosed by S. T. Wu, "Potential Liquid Crystal Mixture for $CO_2$ Laser Applications", *Applied Physics Letter* (vol. 64, page 1204, 1994) and S. T. Wu, "Room Temperature Diphenyl-Diacetylene Liquid Crystals", *Applied Physics*

*Letter* (vol. 61, page 630, 1992). One experimental example of transmission as a function of applied voltage is shown in FIG. 3 for comparison. Variable attenuation is achieved from roughly 4 to 21 volts, with a dynamic range of about 40 dB. Although the results obtained using E44 have a similar dynamic attenuation range, it operates only within a narrow voltage window of 1 to 4 volts.

Figure 4A:
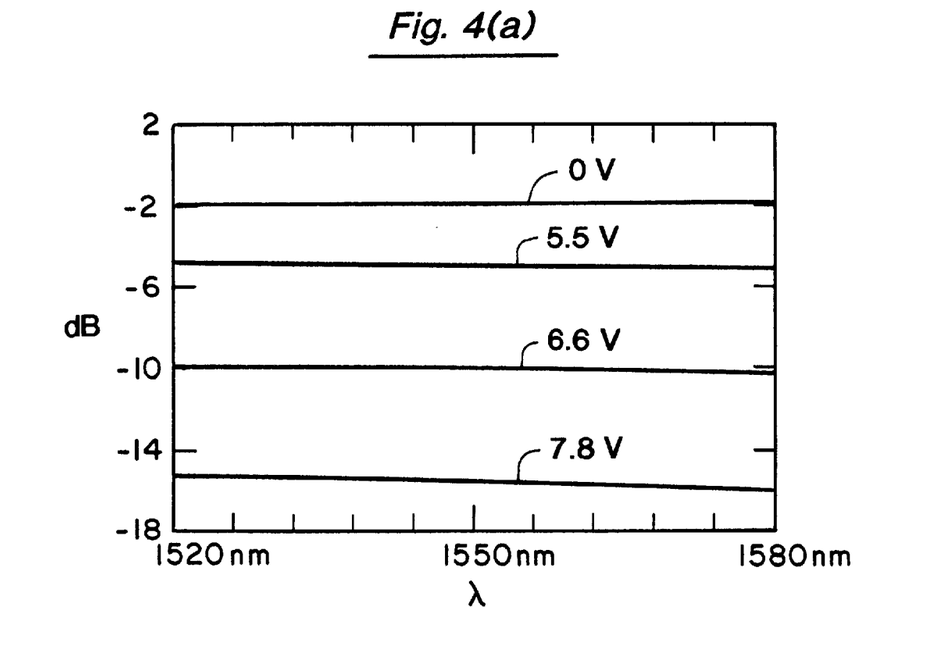
FIG. 4(a) is a graph depicting the spectra of an optical attenuator operated across the wavelength range of 1520 nm to 1580 nm (i.e., a typical optical amplifier window) at various applied voltages.
Figure 4B:
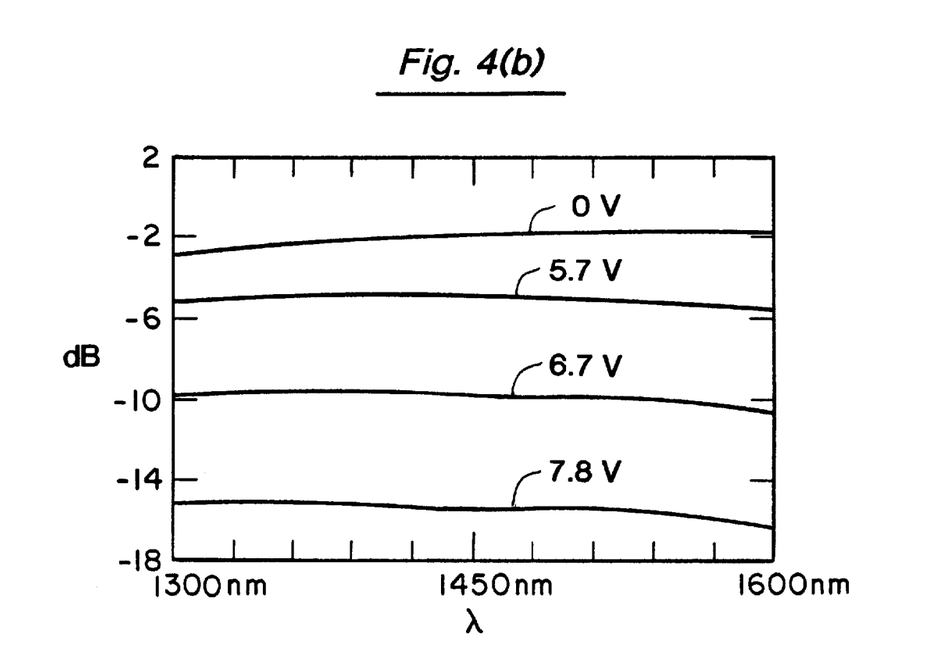
FIG. 4(b) is a graph corresponding to FIG. 4a showing the spectral response of the optical attenuator extended over a wavelength range of 1300 to 1600 nm. Spectral uniformity is within ±0.5 dB.

Another advantage of this invention is the broadband operation of the device. Optical attenuation is recorded for various applied voltages over a range of wavelengths in FIGS. 4(a) and 4(b). It can be seen from these spectra in FIG. 4(a) that the four transmission curves are relatively flat across the typical operating wavelength window of an erbium-doped fiber amplifier, i.e., from 1520 nm to 1580 nm. Further extension of the spectrum to cover both telecommunication windows, namely 1310 and 1550 nm, is shown in FIG. 4(b). An attenuation variation of ±0.5 dB is obtained. This broadband characteristic of the attenuator results from the twisted-nematic liquid crystal polarization modulator. The use of other liquid crystal modulators, such as parallel or π-cell based liquid crystal polarization rotators can also produce a similar spectra, but with a narrower useful wavelength window.

It should also be understood that other types of polarization modulators could be employed in the attenuator. For example, acousto-optic, magneto-optic, and electro-optic polarization controllers could be place between the first birefringent element 10 and the final birefringent element 20 to adjustably rotate the polarizations of the both beams, as previously discussed. The response times of such polarization controllers can be substantially faster that liquid crystal materials.

Figure 5:
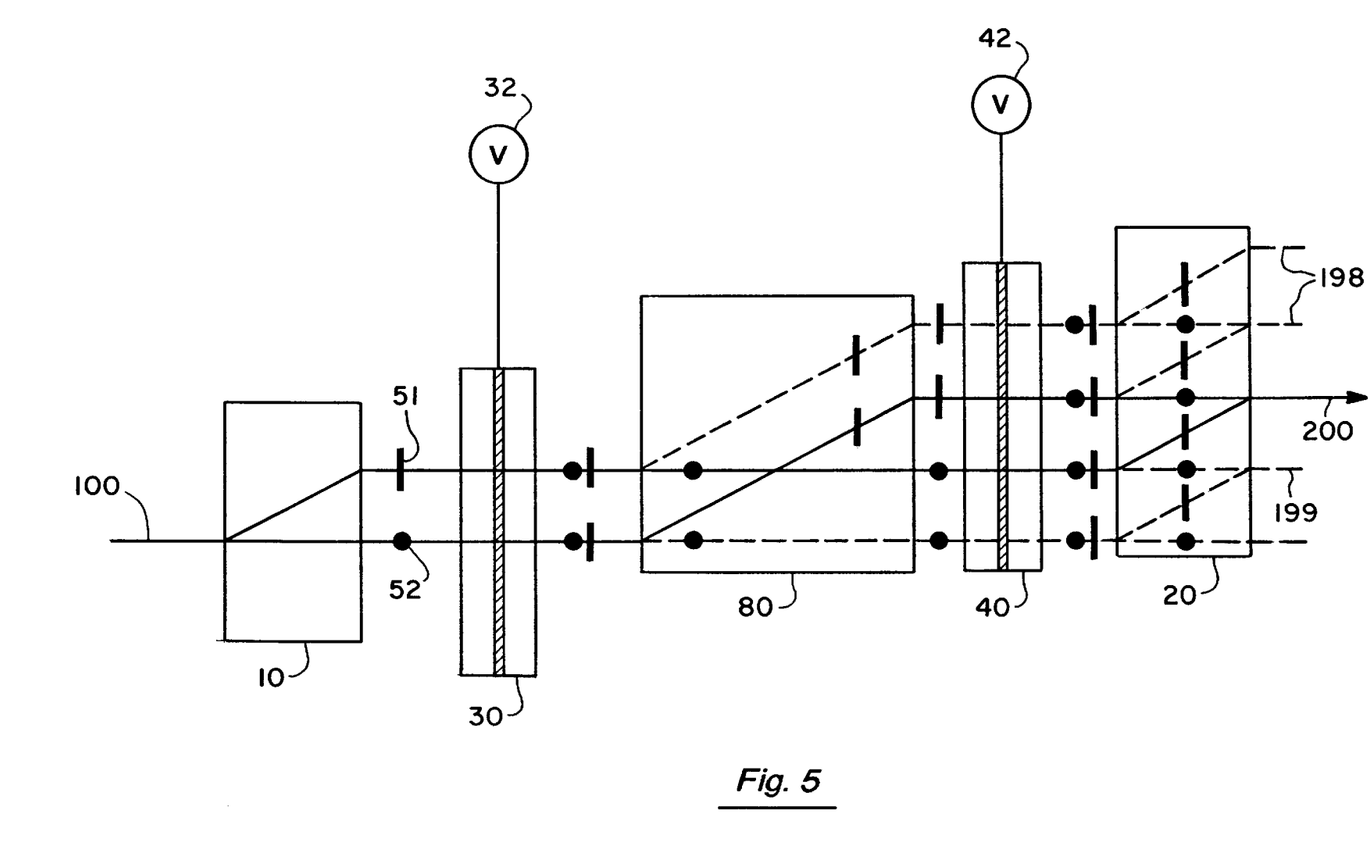
FIG. 5 is a simplified block diagram of a double-stage LCVA for high optical attenuation control.

FIG. 5 shows an example of a double-stage variable attenuator that is capable of much higher optical attenuation. Similar operation and structure are maintained for the first two elements 10 and 30 along the optical path, as we compare FIG. 5 to FIG. 2. The two elements to the right of the first polarization modulator 30 are a second stage consisting of another birefringent element 80 and polarization rotator 40. The thickness of the second-stage birefringent element 80 is increased by a factor of two. In FIG. 5, solid lines represent the desired output beams 200, while the dashed lines represent throw-away optical energies 198 and 199.

Figure 6A:
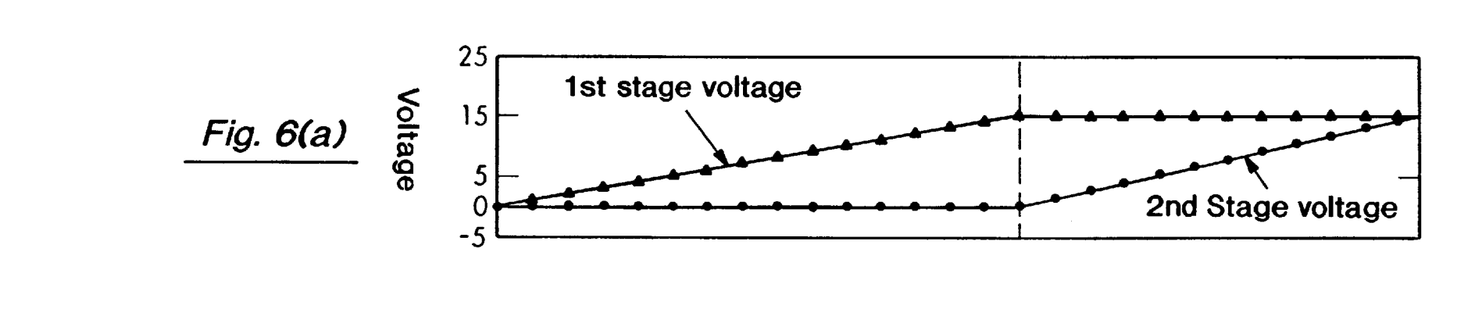
FIGS. 6(a) and 6(b) are graphs showing the attenuation characteristics (FIG. 6(b)) of the double-stage LCVA shown in FIG. 5 as a function of the control voltages applied to the first and second stages (FIG. 6(a)).
Figure 6B:
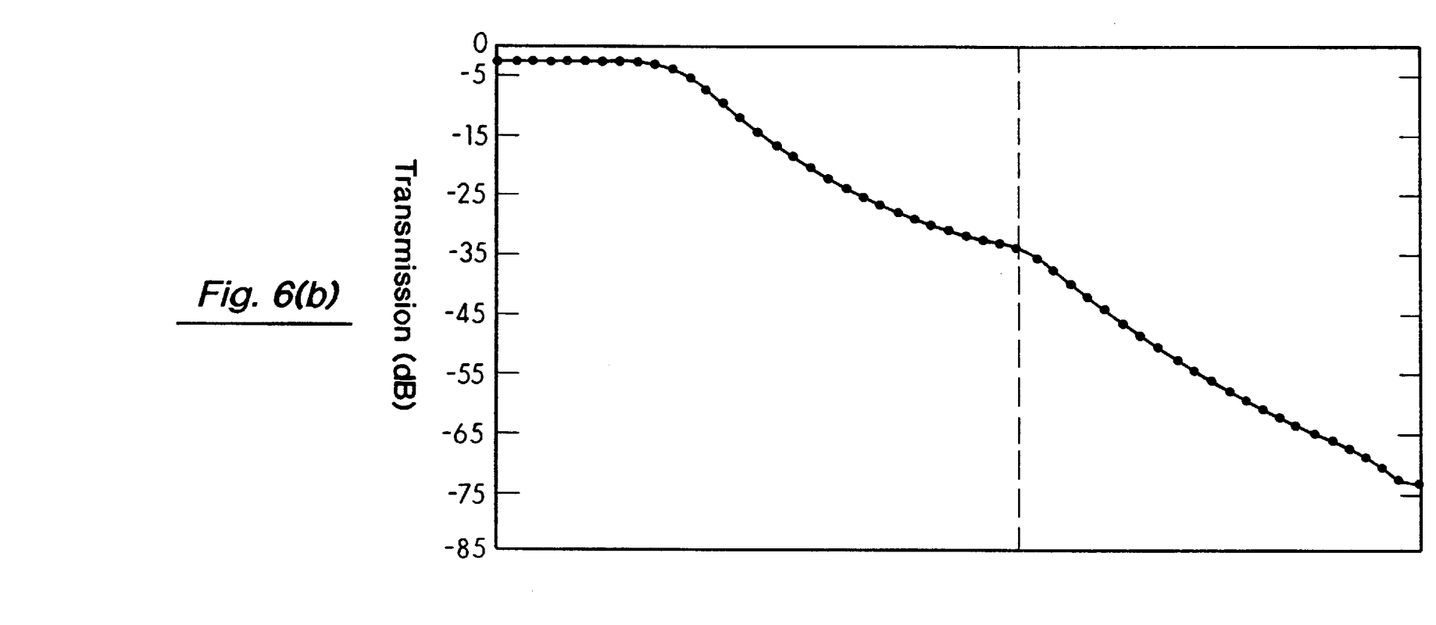
Figure 7A:
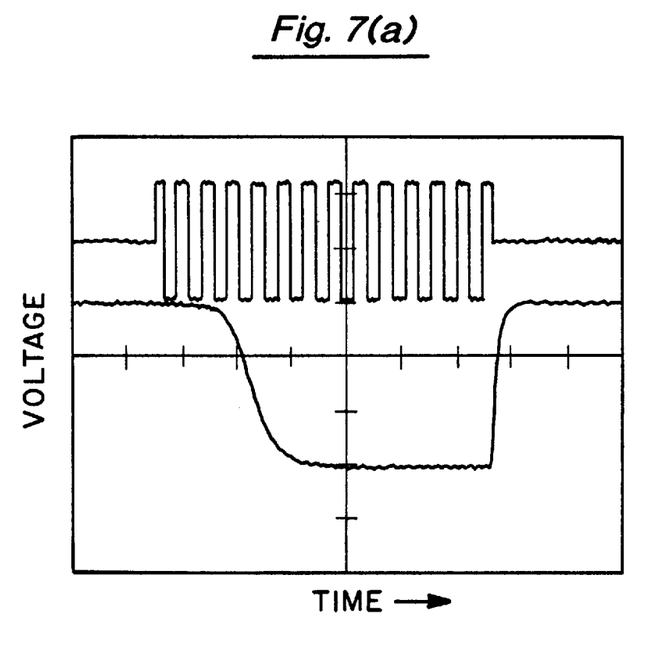
FIGS. 7(a) through 7(d) are graphs showing the switching times for the LCVA using a conventional on/off waveform to drive the LCVA. The upper curves are the driving voltage waveform and the lower curves are the photodetector output voltage indicating transmittance of the LCVA.
Figure 7B:
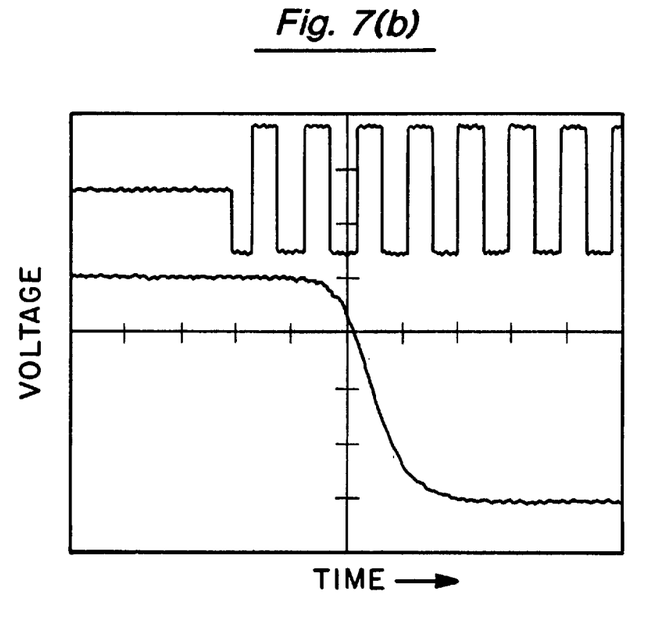
Figure 7C:
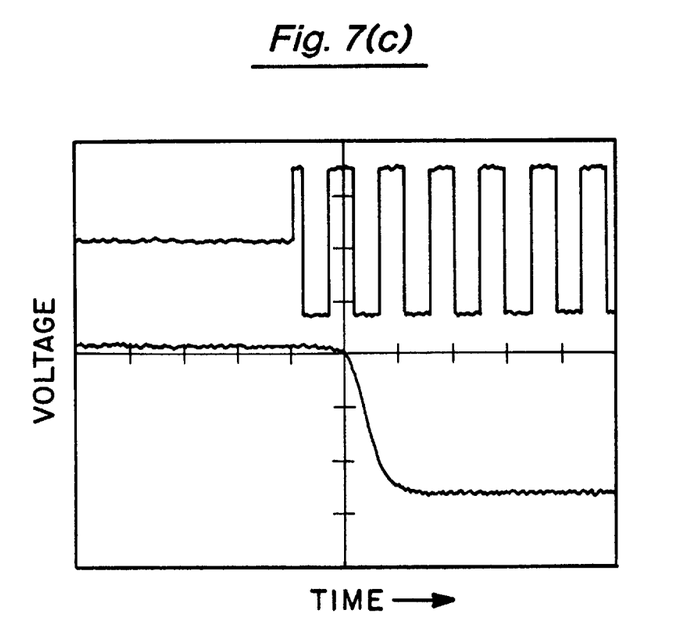
Figure 7D:
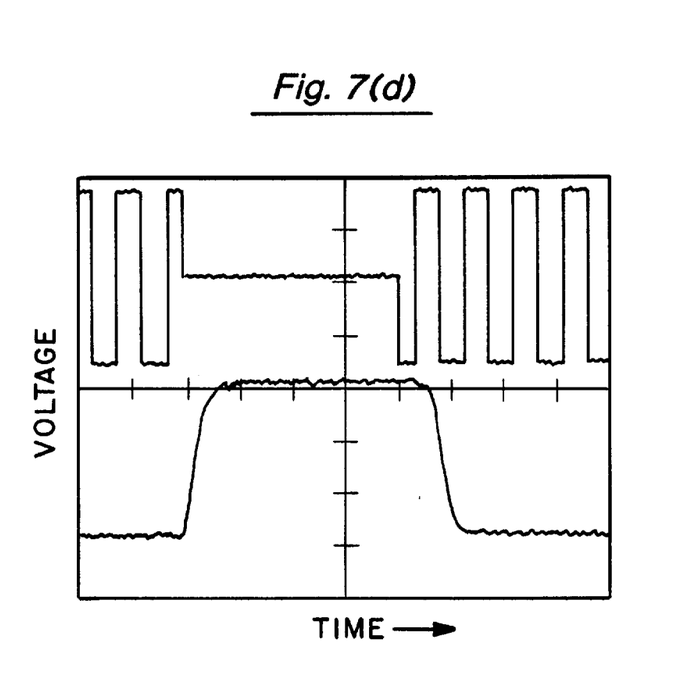
Figure 8A:
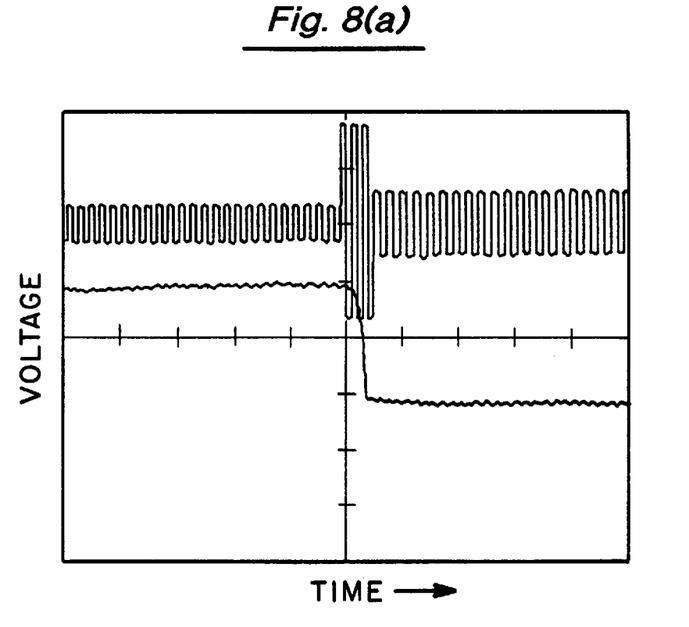
FIGS. 8(a) through 8(d) are graphs showing the switching times for the same LCVA using a tri-level waveform to drive the LCVA. The upper curves are the driving voltage waveform and the lower curves are the photodetector output voltage indicating transmittance of the LCVA.
Figure 8B:
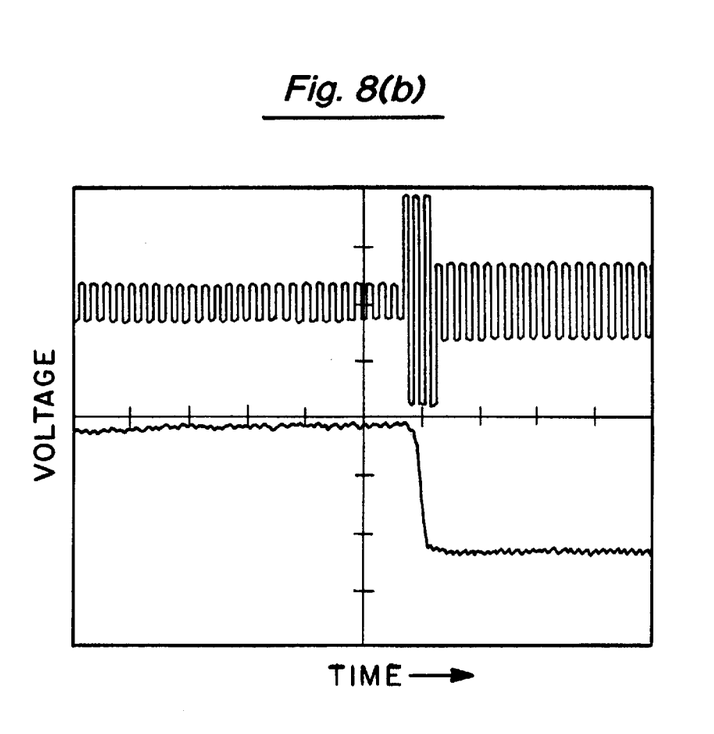
Figure 8C:
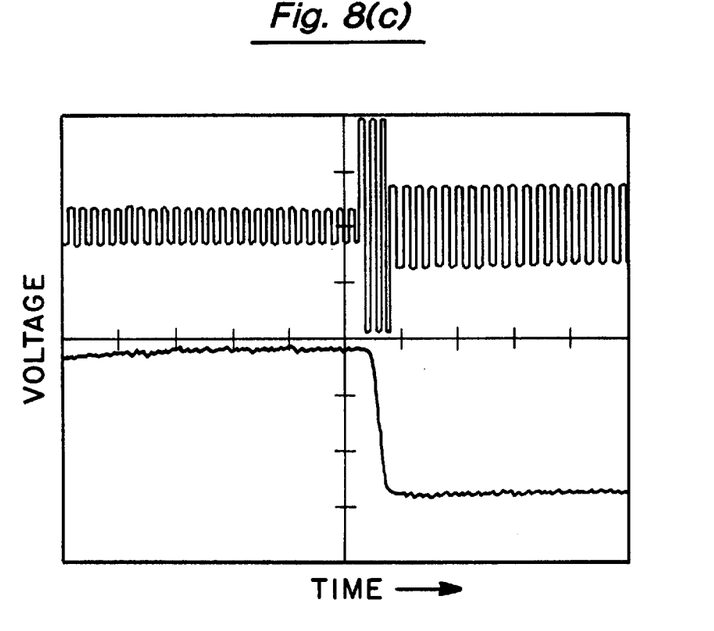
Figure 8D:
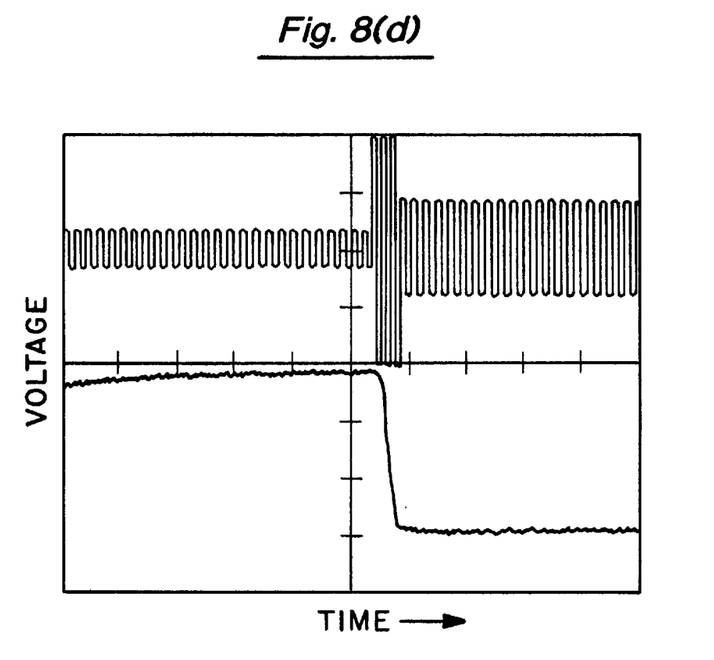

Here again, optical energy input at the input port 100 is decomposed into two orthogonally-polarized beams by the first-stage birefringent element 10. The first-stage polarization modulator 30 rotates part of the polarization of the two beams based on the first control voltage 32. Both beams then enter the second-stage birefringent element 80, which spatially separates the horizontally-polarized and vertically-polarized components of both beams. At the exit plane of the second-stage birefringent element 80, there are four beams carrying orthogonal polarizations (i.e., two horizontally polarized and two vertically polarized beams). The desired portions of the optical energy are carried by the two beams located at the center portion of the exit plane of the second-stage birefringent element 80, as indicated by the solid lines. They pass through the second-stage polarization modulator 40, which can be independently modulated by a second control voltage 42. The degree of optical transmission by the second-stage polarization modulator 40 can be adjustably controlled for further attenuation. The final birefringent element 20 combines the two central beams, which are output at port 200. An example of transmission as a function of the applied voltages 32 and 42 for the double-stage attenuator is shown in FIGS. 6(a) and 6(b). Optical attenuation of −70 dB can be obtained with this structure. This is believed to be the first non-mechanical attenuator to reach such high attenuation.

The present invention could be generalized to an arbitrary number of stages in series. Each stage consists of a birefringent element and a polarization modular. For the Nth stage, the birefringent element spatially separates $2^{N-1}$ input beams into $2^N$ orthogonally-polarized beams, which then pass through its polarization modulator. After the last stage, a final birefringent element 20 combines two of the output beams to output port 200.

FIGS. 7(a) through 7(d) are graphs showing the electro-optic responses of the LCVA 50 using a conventional square-wave driving scheme. The upper curve in each graph is the driving voltage waveform and the lower curve is the photodetector output voltage indicating transmittance of the LCVA 50. As can be seen from FIGS. 7(a)–7(d), switching times are greater than 20 msec, with another delay time of about 25 msec for attenuation changes from −1 dB to −3, −7, −10, and −15 dB, respectively. At smaller modulation steps, such as −1 to −3 dB and −1 to −5 dB, the switching times are even slower, on the order of 100 msec, when taking into account the delay time. This is definitely too slow for optical power regulation application.

In the present invention, we use a three-level driving technique to accelerate switching times. Here, an initial high pulse is sent before the desired control level, and a pre-biased voltage is also applied to the LCVA 50. In the case of FIGS. 8(a)–8(d), a biasing voltage of 3 V (i.e., a voltage under the LCVA's switching threshold) and a pulse of 17–20 volts are used. This tri-level electrical signal shortens all switching times down to less than 2 msec, as can be seen in FIGS. 8(a)–8(d), for attenuation changes from −1 dB to −3, −7, −10 and −15 dB, respectively. These quicker switching times enable the regulator to respond to abrupt optical power surges, and therefore more effectively protect the system.

Figure 9:
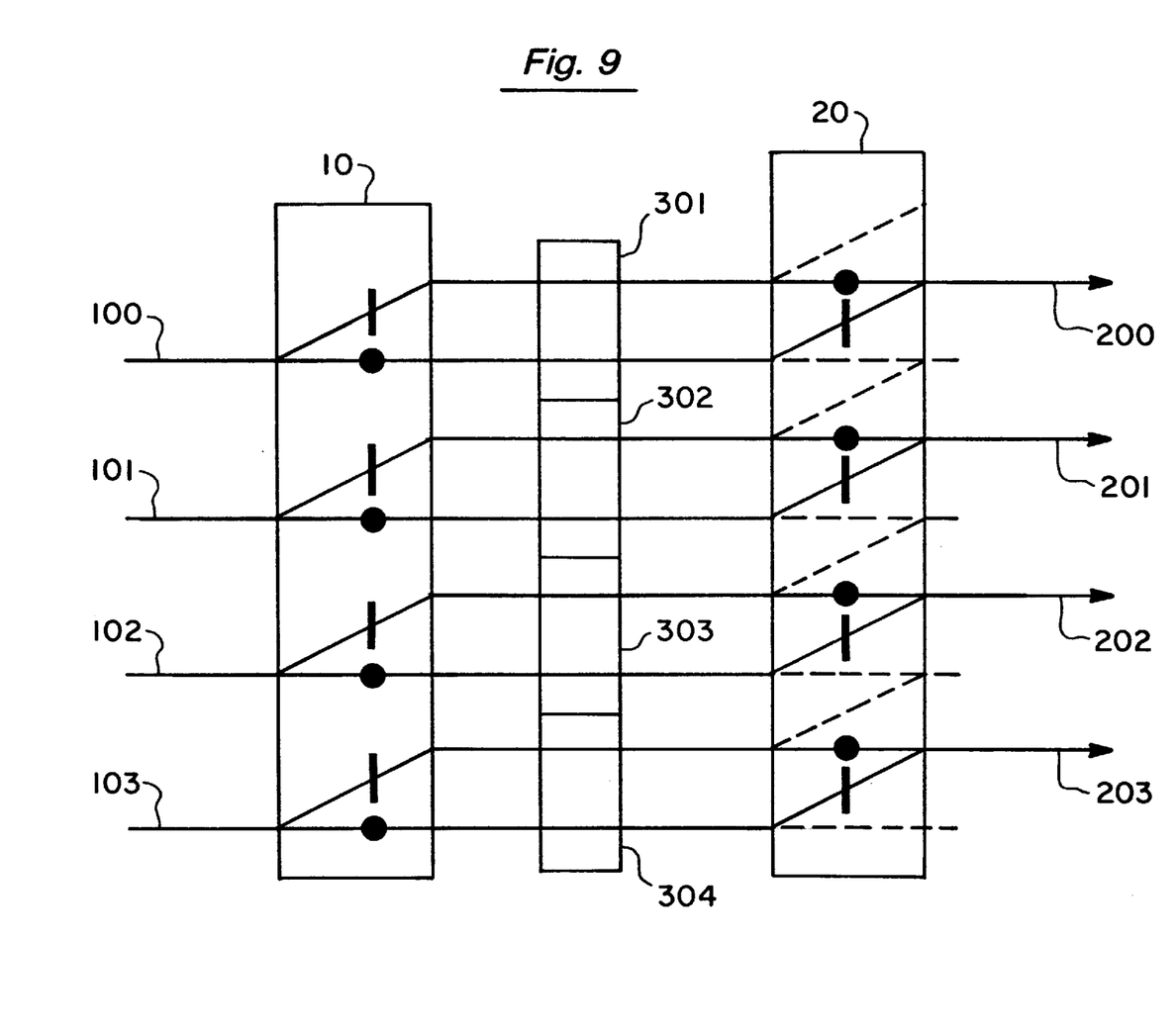
FIG. 9 is a simplified block diagram illustrating an array of variable attenuators with four inputs and outputs.

FIG. 9 is a block diagram showing an array of optical attenuators. One of the strong advantages of using liquid-crystal polarization modulators in contrast to other type of modulators is their spatial light modulation characteristic. As shown in FIG. 9, a liquid crystal polarization modulator is pixelized into four sub-elements 301, 302, 303 and 304, such that each of them can individually modulate a corresponding optical input 100, 101, 102, and 103. This is especially advantageous in WDM systems having multiple ports. The current trend in WDM systems uses eight optical fibers to carry the WDM signals. One array of modulators equipped with eight sub-elements can perform the necessary attenuation for each of the input fibers. Because they are electronically controllable, optical attenuation can be programmed module so that when optical power at any input port 100, 101, 102 or 103 exceeds a predetermined maximum level, attenuation can be applied immediately to reduce the optical energy and thereby protect sensitive photodetectors.

The above disclosure sets forth a number of embodiments of the present invention. Other arrangements or embodiments, not precisely set forth, could be practiced under the teachings of the present invention and as set forth in the following claims.

We claim:

1. An optical power regulator comprising:
  a variable optical attenuator having:
  (a) an input port receiving an input beam;
  (b) an output port;
  (c) a first birefringent element spatially separating said input beam into two orthogonally-polarized beams;

(d) a polarization modulator rotating the polarizations of said orthogonally-polarized beams to an extent determined by a control voltage, wherein said polorization modulator includes a liquid crystal material having a hihg optical birefringence, $\Delta n$, and a low dielectric anisotropy, $\Delta \epsilon$; and (e) a final birefringent element spatially separating said beams exiting said polarization modulator into orthogonally-polarized components and combining two of said components into an output beam at said output port; and a feedback controller monitoring the intensity of said output beam and outputting said control voltage to said polarization modulator to regulate the intensity of said output beam at said output port of said variable attenuator.

2. The optical power regulator of claim 1 wherein polarization modulator comprises a PTTP liquid crystal material.

3. The optical power regulator of claim 1 further comprising a second stage between said polarization modulator and said final birefringent element, said second stage having:

a second birefringent element spatially separating said beams exiting said polarization modulator into two pairs of orthogonally-polarized beams; and a second polarization modulator rotating the polarizations of said beams exiting said second birefringent element to an extent determined by a second control voltage;

wherein said controller also outputs said second control voltage to said second polarization modulator to regulate the intensity of said output beam at said output port.

4. The optical power regulator of claim 1 wherein said controller maintains a constant predetermined intensity of said output beam.

5. The optical power regulator of claim 1 wherein said controller prevents said intensity of said output beam from exceeding a predetermined maximum value.

6. The optical power regulator of claim 1 wherein said controller comprises:

a photodetector producing an electrical signal indicating said intensity of said output beam; and a processor receiving said photodetector signal and producing said control voltage.

7. An optical power regulator comprising:

a variable optical attenuator having:

(a) an input port receiving an input beam;

(b) an output port;

(c) a first birefringent element spatially separating said input beam into two orthogonally-polarized beams;

(d) a liquid crystal polarization modulator rotating the polarizations of said orthogonally-polarized beams to an extent determined by a control voltage, wherein said liquid crystal polarization modulator has a high optical birefringence, $\Delta n$, and a low dielectric anisotropy, $\Delta \epsilon$; and (e) a final birefringent element spatially separating said beams exiting said polarization modulator into orthogonally-polarized components and combining two of said components into an output beam at said output port; and a feedback controller having:

(a) a photodetector pdoducing an electical signal indicating said intensity of said output beam from said variable attenuator; and (b) a processor receiving said photodetector signal and outputting said contol voltage to said polarization modulator to regulate the intensity of said output beam from said variable attenuator.

8. The optical power regulator of claim 7 wherein said polarization modulator comprises a PTTP liquid crystal material.

9. The optical power regulator of claim 7 further comprising a second stage between said polarization modulator and said final birefringent element, said second stage having:

a second birefringent element spatially separating said beams exiting said polarization modulator into two pairs of orthogonally-polarized beams; and a second polarization modulator rotating the polarizations of said beams exiting said second birefringent element to an extent determined by a second control voltage;

wherein said processor also outputs said second control voltage to said second polarization modulator to regulate the intensity of said output beam at said output port.

10. The optical power regulator of claim 7 wherein said controller maintains a constant predetermined intensity of said output beam.

11. The optical power regulator of claim 7 wherein said controller prevents said intensity of said output beam from exceeding a predetermined maximum value.

12. An optical power regulator comprising:

a variable optical attenuator having:

(a) an input port receiving an input beam;

(b) an output port;

(c) at least one stage in series, in which the first stage in said series is coupled to said input port, and in which the Nth stage has:

(i) a birefringent element receiving $2^{N-1}$ input beams and spatially separating said input beam into $2^N$ orthogonally-polarized beams; and (ii) a polarization modulator rotating the polarizations of said orthogonally-polarized beams from said birefringent element to an extent determined by a control voltage for said Nth stage, said polarization modulator includes a liquid crystal material having a high optical birefringence, $\Delta n$, and a low dielectric anisotropy, $\Delta \epsilon$; and (d) a final birefringent element spatially separating said beams exiting said polarization modulator of the last stage in said series into orthogonally-polarized components and combining two of said components into an output beam at said output port; and a feedback controller monitoring the intensity of said output beam and outputting said control voltages to said polarization modulators for said N stages to regulate the intensity of said output beam at said output port of said variable attenuator.

13. The optical power regulator of claim 12 wherein said polarization modulator comprises a PTTP liquid crystal material.

14. The optical power regulator of claim 12 wherein said controller comprises:

a photodetector producing an electrical signal indicating said intensity of said output beam; and a processor receiving said photodetector signal and producing said control voltages for each of said stages.

15. The optical power regulator of claim 12 wherein said controller maintains a constant predetermined intensity of said output beam.

16. The optical power regulator of claim 12 wherein said controller prevents said intensity of said output beam from exceeding a predetermined maximum value.

* * * * *